US010936751B1

(12) United States Patent
Scotney et al.

(10) Patent No.: US 10,936,751 B1
(45) Date of Patent: Mar. 2, 2021

(54) SELECTIVE ANONYMIZATION OF DATA MAINTAINED BY THIRD-PARTY NETWORK SERVICES

(71) Applicant: StratoKey Pty Ltd., Hobart (AU)

(72) Inventors: Anthony Scotney, Hobart (AU); Sabyasachi Routray, Hobart (AU)

(73) Assignee: StratoKey Pty Ltd.

( * ) Notice: Subject to any disclaimer, the term of this patent is extended or adjusted under 35 U.S.C. 154(b) by 257 days.

(21) Appl. No.: 16/221,261

(22) Filed: Dec. 14, 2018

(51) Int. Cl.
*G06F 21/62* (2013.01)
*H04L 29/06* (2006.01)
*G06F 16/903* (2019.01)
*G06F 16/908* (2019.01)
*G06F 16/25* (2019.01)
*G06F 40/284* (2020.01)

(52) U.S. Cl.
CPC ........ *G06F 21/6254* (2013.01); *G06F 16/258* (2019.01); *G06F 16/908* (2019.01); *G06F 16/90344* (2019.01); *G06F 21/6227* (2013.01); *G06F 40/284* (2020.01); *H04L 63/0421* (2013.01); *G06F 2221/2115* (2013.01)

(58) Field of Classification Search
CPC ............... G06F 21/6254; G06F 40/284; G06F 21/6227; G06F 16/258; G06F 16/908; G06F 16/90344; G06F 2221/2115; H04L 63/0421
See application file for complete search history.

(56) References Cited

U.S. PATENT DOCUMENTS

| 9,076,004 | B1* | 7/2015 | Bogorad | ............... G06F 21/602 |
| 2004/0024826 | A1 | 2/2004 | Halahmi | |
| 2008/0301805 | A1* | 12/2008 | Bharara | ................... H04L 67/12 726/21 |
| 2009/0217354 | A1 | 8/2009 | Blum | |
| 2010/0071052 | A1 | 3/2010 | Mao | |
| 2012/0030294 | A1 | 2/2012 | Piermot | |
| 2012/0117458 | A1 | 5/2012 | Holloway | |
| 2014/0095865 | A1 | 4/2014 | Yerra | |
| 2014/0122866 | A1* | 5/2014 | Haeger | ................. H04L 63/061 713/153 |
| 2015/0039887 | A1 | 2/2015 | Kahol | |
| 2015/0067881 | A1* | 3/2015 | Badstieber | .......... G06F 21/6254 726/26 |
| 2015/0278545 | A1* | 10/2015 | Bigras | ................. H04L 63/0421 726/26 |
| 2016/0217269 | A1* | 7/2016 | Goettges | ................ G16H 30/20 |

(Continued)

*Primary Examiner* — Cheng-Feng Huang
(74) *Attorney, Agent, or Firm* — Mahamedi IP Law LLP

(57) ABSTRACT

A data anonymization computer system selectively anonymizes data items from data structures prior to forwarding the data structures to a third-party network service. The data anonymization computer system identifies at least a respective data item of the data structure that meets a set of conditions, including at least a first condition in which at least a portion of the respective data item has a format that coincides with the predetermined format and replaces a set of characters of the respective data item having the format with a string of characters of a respective token of a pool of tokens. The data anonymization computer system forwards the data structures to the third-party network service with each of the respective data items having the string of characters of the respective token in place of the replaced set of characters.

15 Claims, 4 Drawing Sheets

(56) References Cited

U.S. PATENT DOCUMENTS

| | | |
|---|---|---|
| 2016/0261668 A1 | 9/2016 | Joel |
| 2016/0269371 A1 | 9/2016 | Coimbatore |
| 2017/0034100 A1 | 2/2017 | Zink |
| 2017/0243028 A1* | 8/2017 | LaFever .............. G06F 21/6263 |
| 2019/0286850 A1* | 9/2019 | Popescu ................. G16H 10/60 |
| 2020/0065523 A1* | 2/2020 | Fukuda ................... H04L 51/02 |
| 2020/0073940 A1* | 3/2020 | Grosset ................. G06F 16/258 |

* cited by examiner

US 10,936,751 B1

SELECTIVE ANONYMIZATION OF DATA MAINTAINED BY THIRD-PARTY NETWORK SERVICES

FIELD OF THE INVENTION

Examples relate to data anonymization, and more specifically, to selective anonymization of data maintained by third-party network services.

BACKGROUND

Third-party network services, such as cloud, software as a service ("SaaS"), and web services, are used by enterprises and other customers to retain vast quantities of data of which some can often be subject to privacy or other confidentiality restrictions. For example, governmental regulations can specify that certain types of information, such as Electronic Protected Health Information (ePHI) or Personally Identifiable Information (PII) to be erased after such data is deemed "expired". In the context of third-party network services, eliminating data that is subject to such privacy of confidentiality restrictions is a technical challenge, as the data items (e.g., phone numbers, names, email addresses, etc.) that are subject to such restrictions are typically part of a larger data set (e.g., record), and simple deletion of a specific data item can cause inconsistencies within the larger data sets (e.g., within a record, or amongst a collection of records), making use of the larger data set problematic.

DETAILED DESCRIPTION

Figure 1:
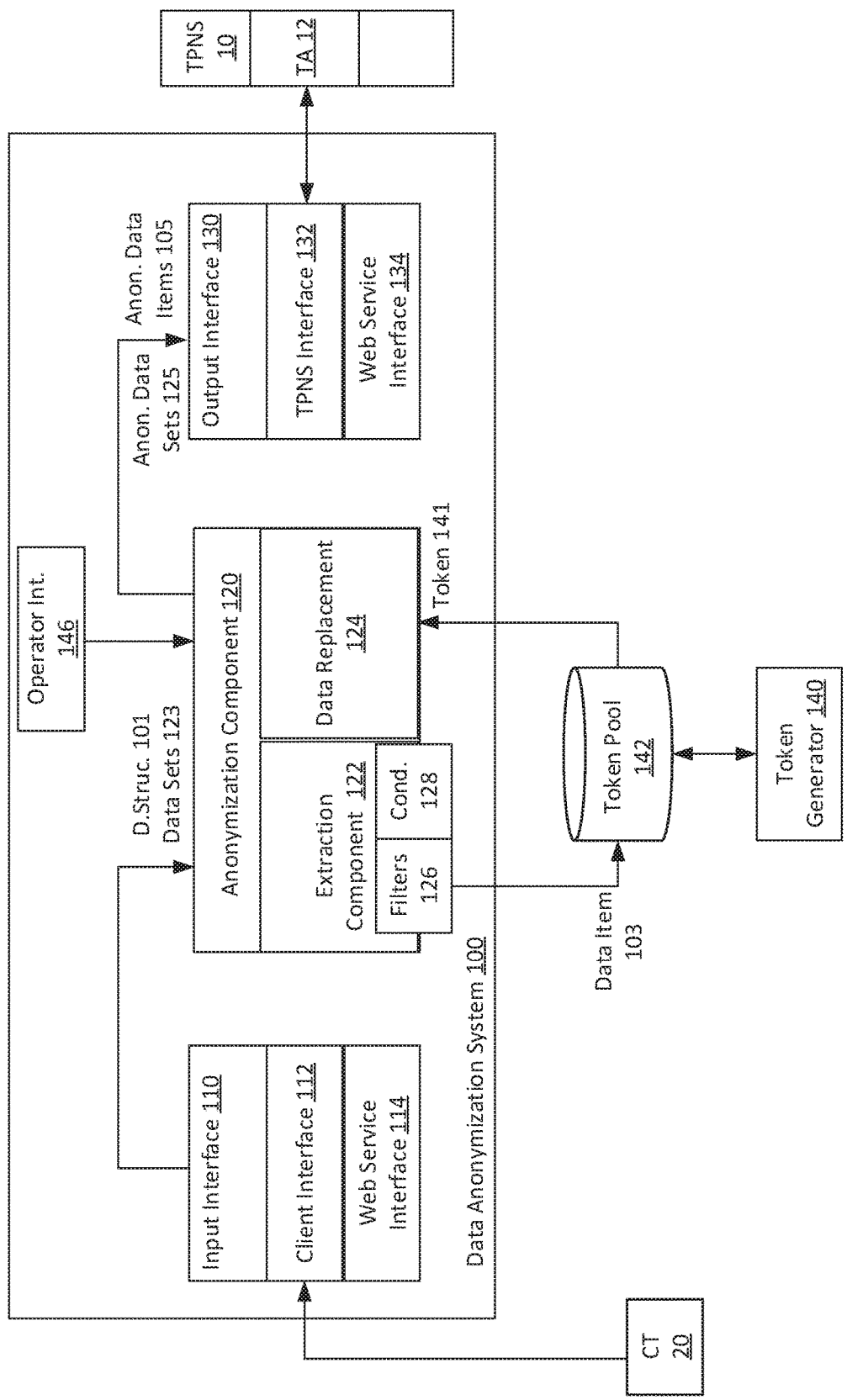
FIG. 1 illustrates a network computer system to selectively anonymize data for storage with a third-party network service.

A network computer system to selectively anonymize data items of a collection of data structures. As described by various examples, the network computer system can be implemented as a web service, intercept service, or combination thereof.

According to examples, a network computer system identifies whether a respective data item of a data structure meets one or more conditions for anonymization. The conditions may include a format condition in which at least a portion of the respective data item has a format that coincides with a designated or predetermined format. The network computer system may operate to replace a set of characters of the respective data item, where the data item has a format that coincides with the predetermined format. The network computer system can replace the identified set of characters with the string of characters of a respective token, where the token is uniquely generated and stored as part of a token pool. The network computer system can further cause the respective data to be stored as part of, or with a respective third-party network service.

In examples, a data item refers to a predefined collection of data elements (e.g., alphanumeric characters, special characters, etc.), such as provided by a sequence of characters that represent a name, a government identifier (e.g., social security number), a telephone number, credit card information, a physical address, an email or other messaging identifier, or predefined codes relating to health or demographic information. Data items can be a part of an underlying data structure, such as a record or document. In some examples, data items that are subject to anonymization can exist in a structured form as part of a data structure (e.g., field value), or alternatively, as part of the content of a record or document.

The term "format" and its variants (e.g., "subformat"), in context of a data item, means one or more discernable characteristics relating to any one of (i) an individual constituent data element, (ii) a subportion or combination of constituent data elements, and/or (iii) the collective constituent data elements of the data item. In examples, a format can be defined by a set of rules that correlate to, or otherwise define a corresponding set of discernable characteristics of a type of data item. By way of examples, the rule set can define the format of a data item by (i) a character length of the data item and/or portion(s) of the data item (e.g., number of characters that comprise the data item or portion of the data item), (ii) type, presence or placement (e.g., sequential placement) of special characters (e.g., "@", "-", ".") within a series of characters that constitute the data item, (iii) a characteristic in the arrangement of data elements of the data item (e.g., data elements that are of a first type (e.g., alphabetical) are sequentially before data elements that are of another value type (e.g., numbering)), (iv) a type of value (e.g., alphabetical, numerical, special character, etc.) for any part of the data item, (v) a value range of a set of data elements that constitute the data item (e.g., between 01 and 12 to denote month of year on credit card), and/or (vi) a computational discerned characteristic as between data elements or portions of the data item, such as may be discernable through use of an algorithm (e.g., a checksum algorithm, such as the Luhn algorithm for credit card numbers).

A format of a data item is said to coincide with a format of a token if the format of the data item maps to, or is the same as the format of the token. Depending on implementation, for example, a data item may match to a predetermined format of a token if (i) the data item has the same number of characters, along with a same placement of a set of special characters as that of the token; or (ii) the data item is different in length, use or placement of special characters as compared to the token, but can be mapped to the predetermined format by a format rule (e.g., replace each character of the predetermined format with a byte value). As additional illustrative examples, the format of the data item and the token may coincide if, for example, a format of a portion of the data item (e.g., value range, type of value, arrangement characteristic, etc.) corresponds or otherwise maps to a corresponding portion of the token. As another example, the format of the data item and the token may also coincide if a computationally discerned characteristic is shared (e.g., checksum computation, in accordance with Luhn algorithm) between the data item and the token.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, servers, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Data Anonymization System

FIG. 1 illustrates a network computer system to selectively anonymize data for storage with a third-party network service ("TPNS"). In examples, a data anonymization system 100 is implemented using a network computer system, such as a server, or combination of servers. As described by various examples, the anonymization system 100 can anonymize portions of data structures that are transmitted from client terminals, servers or systems to the anonymization system 100 for storage with the TPNS 10. As an addition or variation, the anonymization system 100 can anonymize portions of data structures that are stored with TPNS 10, such that stored data structures are updated to reflect anonymization of select values. In such examples, the TPNS 10 can correspond to a cloud, SaaS or web service, and data structures that are subject to anonymization by the anonymization system 100 can be associated with a target account 12 (e.g., enterprise or customer accounts).

According to examples, the data anonymization system 100 includes one or more input interfaces 110, an anonymization component 120, and one or more output interfaces 130. As described by examples, the anonymization component 120 utilizes tokens 141 from a token pool 142 to anonymize select data items, for storage with the TPNS 10. Each of the input interface 110 and the output interface 130 can include a combination of processes, including processes to implement a REST, SOAP and/or client interface, as well as processes to retrieve and/or write data to the TPNS 10.

In examples, the TPNS 10 is implemented as part of an intercept service that anonymizes data sets, communicated from client terminals 20 or other entities, for storage with target account 12 (e.g., enterprise account) of the TPNS 10. In such examples, the input interface 110 can include a client interface 112 to receive client communications. The client communications can be processed for data sets that are subjected to anonymization, using the anonymization component 120. The output interface 130 can include TPNS interface 132 to cause the TPNS 10 to store anonymized versions of the data sets with the target account 12.

As another variation, the TPNS 10 is implemented as a web-service to selectively anonymize account data that is stored with the target account 12 of the TPNS 10. In such examples, the web service interface 114 can be called or otherwise triggered by other programmatic components or processes, to retrieve data from a target location (e.g., target account 12 of the TPNS 10). In examples, the web service interface 114 can be triggered by a request from an enterprise (e.g., client terminal 20) and/or from the TPNS 10. Still further, in other examples, the web service interface 114 can be triggered by a configuration or setting, such as based on a schedule or response to a predetermined event. By way of examples, (i) the web service interface 114 can be programmatically triggered to retrieve data sets 123 (e.g., all data sets that were created or modified before a specific date) from the target account 12 on a monthly basis; and/or (ii) the web service interface 114 can be triggered to receive specific data sets 123 as part of a workflow that is initiated by a specific user or entity requesting anonymization of a particular set of data (e.g., user requests to have their data anonymized). In such examples, the received data sets 123 are subject to anonymization to generate anonymized versions of the data sets ("anonymized data sets 125"). The output interface 130 can utilize the TPNS interface 132 to update existing data sets of the target account 12. In variations, the output interface 130 can include a web service interface 134 that returns anonymized data sets 125 to another entity (e.g., separate intercept service) or direct web service call, for storage with the target account 12 of TPNS 10.

In some variations, the TPNS 10 can initiate or otherwise use the anonymization system 100 as a web service, by using, for example, a call request to trigger the input interface 110, passing the data sets 123 from the target account 12 of TPNS 10. In such variations, the TPNS 10 can use the web service interface 134 to return anonymized data sets 125 to the TPNS 10.

In examples, the anonymization component 120 includes an extraction component 122 to select data items 103 from respective data sets 123 for anonymization, and a data replacement component 124 to replace data of the selected data items 103 with a randomly-generated and unique set of tokens.

In examples, the extraction component 122 can operate to extract data structures 101 from the data sets 123, and further to identify data items 103 within each identified data structure 101 which meets a condition, or set of conditions for anonymization. An extracted data structure 101 can correspond to, for example, (i) a structured record in which respective data items 103 are field values of the record; or (ii) a document or file in which respective data items form part of the document's content (e.g., column or cell of a CSV file, delineated set of items in a text file, word of a document file, etc.), or (iii) the entire content of the document.

In some examples, the extraction component 122 includes a set of filters 126 that identify data items 103 designated portions of the respective data sets 123 for anonymization. Each filter of the filter set 126 can identify a condition, or set of conditions, for identifying data items which are to be anonymized. For example, the filter set 126 can include one or multiple filters to identify one or more specific fields of a data record, where each identified field is pre-selected for anonymization. In such examples, the filter set 126 can implement a format-driven anonymization, by implementing the extraction component 122 to use the filter set 126 to identify the collection of data items 103 that are to be anonymized.

As an addition or alternative, the filter set 126 can include a second filter to identify data items of a particular format from a larger set of data. Each filter of the filter set 126 can, for example, identify a condition or rule for identifying a candidate set of character strings as being a data item of a predetermined type. In examples, a condition for each filter can include (i) a length of the data item (e.g., 7 or 10 characters for phone number), (ii) a type of characters used by the data item (e.g., numbers for phone numbers), and/or (iii) presence of special markers in the character string. By way of example, character markers such as "P" or "PH:" or "Cell" can serve as a marker for a phone number, when the marker is followed by a series of characters that are numbers, in a given format (e.g., ten numbers formatted as X-XXX-XXX-XXXX or 1(XXX) XXX-XXXX, etc.). As another example, a character of "@" can mark an email address if the character marker is positioned in a string of characters that meet other conditions (e.g., . . . X@XXX.YYY where Y is one of the set of top-level domains, such as ".com", ".org", ".biz", or ".gov"). Similar conditions can be defined for other types of data items 103 which may be anonymized, such as names, which can include special markers (e.g., "Mr.", "Ms." or "Mrs.") and formats.

Still further, the extraction component 122 can deploy the filter set 126 with an additional set of conditions 128, including rules or other logic. The additional conditions 128 can, for example, restrict the filters 126 to identifying data items that meet an additional criterion or set of criteria, such as an age of the data item (e.g., based on creation date, modification date or other associated metadata). As another example, the additional conditions 128 can be based on data that is not part of the data item 103 where the anonymization is to occur. For example, the additional conditions can be applied to data items 103 that meet the conditions of the filter set 126, and further meet a value condition of a particular value of an associated data item. To illustrate, fields that represent Personal Identifiable Information ("PII") of a person can be identified as data items 103 for anonymization if the additional condition of a check field (e.g., representing a corresponding input indicating a desire of the person in question to be anonymized) or the value of some other field value (e.g., representing an age of the person in question) meets a predetermined threshold (e.g., above the age of 13).

In examples, the filter set 126 and the additional conditions 128 can be configurable by, for example, an administrator of the target account 12, where the anonymized data is to be stored. The anonymization component 120 can, for example, include an operator interface 146 to enable an administrator user to specify conditions for implementing filters or other rules by which data items 103 are selected for anonymization.

To replace data of the selected data items 103, examples provide for the data replacement component 124 to use tokens 141 from a pre-existing token pool 142, where each token 141 is a cohesive and non-alterable sequence of values (e.g., characters), having a pre-defined format that coincides with a format of the data item or portion thereof that is to be replaced by the particular token. The token pool 142 may be populated and replenished by a token generator 140, which can, based on implementation, be included with the anonymization system 100, or provided as a separate component.

In examples, the token generator 140 can generate tokens 141 for the token pool 142 that are unique, such that each generated token 141, whether created at inception of token pool 142 or at a later time for its replenishment, is unique from all other existing or previously used tokens 141 of the token pool 142. In examples, each token 141 of the token pool 142 can correspond to a string of characters that have a predetermined format. The token pool 142 can include one or multiple collections of tokens, where the tokens of each collection have a respective format that coincides with a corresponding format of data items that are to be anonymized with the respective tokens. The tokens 141 of a given format can include characters that are randomly selected from a character library, which can include, depending on implementation, alphanumeric characters, including characters of one or more alphabets (e.g., Latin alphabet, Chinese alphabet, Arabic alphabet, Devanagari alphabet, etc.) or a customized convention.

The data replacement component 124 replaces data of select data items 103, as identified by the extraction component 122, with tokens 141 from the token pool 142, without losing structure or utility of the data structure 101 from which the data item 103 was extracted. In particular, the token generator 140 can generate tokens that have a predetermined format that coincides with the format of the type of data item 103 which is to be anonymized. By adhering the format of the tokens to that of the data item 103 that is to be anonymized, the anonymized form of the data items (anonymized data item 105) can maintain its utility within the TPNS 10. Moreover, since the tokens 141 are generated to be unique over time from all other tokens, there is no risk that any given anonymized data item 105 will be inconsistent with another data item, as could otherwise occur if two data items from unrelated records inadvertently have the same value. In examples, the anonymized data items 105 can be used to generate an updated data set for associated data structure(s) of the target account 12, residing the TPNS 10. The TPNS interface 132 can, for example, update respective records of the target account 12 of TPNS 10 with anonymized data items 105 (or their respective data structures), meaning records and/or field values or updated with corresponding anonymized records and/or respective anonymized field values.

To illustrate, an enterprise network can be operated by an organization that has a policy to not use live PII production data in a SaaS environment. To protect the policy, the anonymization component 120 can be configured to implement filters 126 and additional conditions 128 which identify PII-type information (e.g., phone numbers, names, email addresses) from a variety of data structures which the organization may use with the TPNS 10. If an employee uploads, for example, a CSV file or other data structure (e.g., text document) that contains some data items which qualify as PII-type information, the anonymization system 100 can intercept and inspect the CSV file. The anonymization component 120 can use the filter set 126 and additional conditions 128 to extract data items contained in the file which qualify as PII-type information. The CSV file is then modified to replace the identified PII type information with similarly formatted character sequences, each of which correspond to a randomly generated, pre-existing and unique anonymization token. This data structure (e.g., CSV file) with the anonymized data is passed on to the TPNS 10.

As another illustration, an enterprise network can provide a feature that a user can select to anonymize data on demand in a live instance of the TPNS 10. For example, a user can edit an existing record by selecting a checkbox that specifies that data items of the record are to be anonymized. The user submits the record, and the anonymization system 100 intercepts the data, identifies the data as having a pre-configured format, and anonymizes the record by selectively replacing the PII fields with anonymization tokens 141. This anonymized record is then used to update a corresponding record maintained with the TPNS 10.

As described with various examples, anonymized data items 105 maintain their format. For example when an email address is anonymized by the system 100, the anonymized form the email address meets standard for email address format. For example, the anonymization component 120 can alter the email address john.smith@example.com to "ab332.wwswe@fe23qpxm.csd"—the appropriate format for an email. The anonymized email address is acceptable to, for example, the TPNS 10, as it meets the relevant format requirements, whilst being constructed from one or more anonymization tokens.

To further illustrate examples in which the anonymization system 100 is employed as a back end process, the anonymization system 100 can implement a workflow that serves to automatically anonymize data after the data has reached its expiry date. A workflow as described may be implemented by a programmatic component or process, such as a component or process of the TPNS 10. In examples, the anonymization system 100 can respond to such requests (via the web service interface 134) with individual anonymization tokens 141, or sets of anonymization tokens that meet a format condition (e.g., specific format for phone numbers). The requesting entity can then process the returned anonymization tokens 141 to permanently alter and anonymize existing data that has expired.

Intercept Computer System

Figure 2:
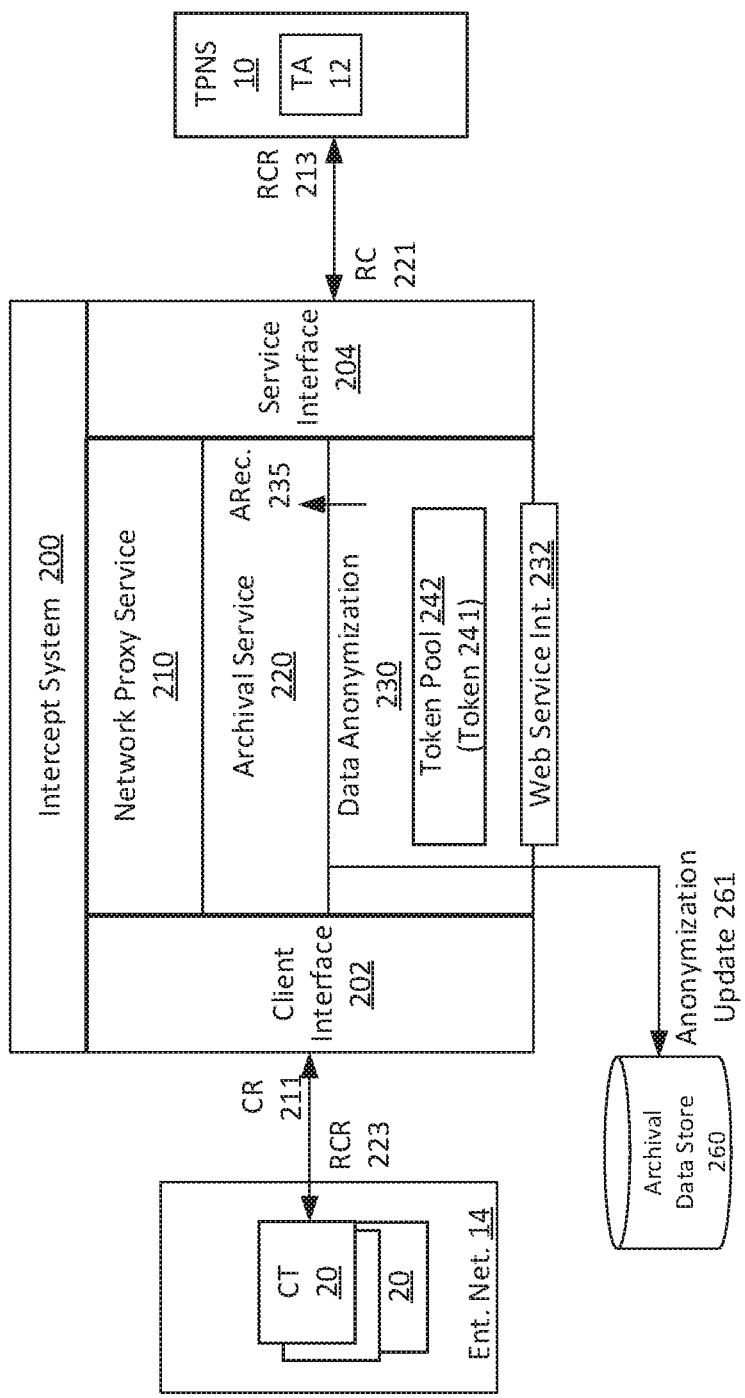
FIG. 2 illustrates an intercept computer system on which an example data anonymization service is implemented.

FIG. 2 illustrates an intercept computer system on which a data anonymization service is implemented. In more detail, an intercept computer system 200 can be implemented using a network computing system, such as either a physical or virtual server, or combination of such servers, to receive and forward communications between the group of client terminals 20 and the third-party network service 10 ("TPNS 10"). Each of the client terminals 20 may correspond to, for example, an end user terminal, work station or other computer system capable of communicating with the intercept system 200 over the World Wide Web and/or other data networks.

In examples, the intercept system 200 provides anonymization as an intercept service (represented by anonymization service 230), as between client terminals 20 and the TPNS 10. As an intercept service, the anonymization service 230 can anonymize data extracted from client requests 211, before non-anonymized forms of the extracted data are communicated to the TPNS 10. While some examples provide for the anonymization service 230 to be implemented as an intercept service, in variations, the anonymization service 230 can be implemented as on-demand process that can retrieve data for anonymization from the TPNS 10 as a response to a triggering event or condition. Such triggering events can be detected through use of other intercept services, such as described with some examples below. However, as described with some examples of FIG. 1, the anonymization service 230 can also be implemented as a backend web service that can be called or otherwise utilized by, for example, an automated cloud or SaaS process (such as where target data for anonymization may reside). As an addition or variation, the anonymization service 230 can be called or otherwise utilized by a programmatic administrative component of the enterprise network 14. Still further, in some examples, the anonymization service 230 can operate as a hybrid implementation (e.g., intercept-capable service), having processes for operating as both an intercept service and a programmatically driven or automated backend service. In addition, while the anonymization service 230 is described as a service that may be separate or distinct from other services of the system 200, in variations, the anonymization service 230 can be implemented as an integrated component or functional aspect of a larger service that includes functionality of one or more other services, such as described with examples provided below.

As illustrated by an example of FIG. 2, the intercept system 200 can implement anonymization service 230 with one or more additional intercept services. In examples, the intercept system 200 includes a client interface 202 to communicate with a set of client terminals 20, a service interface 204 to communicate with the TPNS 10, and one or multiple intercept or intercept-capable services. In an example as described, the services of the intercept system 200 includes a network proxy service 210, archival service 220 and the anonymization service 230. As an addition or alternative, the anonymization service 230 can be used with other types of proxy or intercept services, such as, for example, a traffic monitoring service, a policy enforcement service, and/or a content configuration service. Still further, as described with other examples, the anonymization service 230 can be used as an independent intercept service.

In examples, the network proxy service 210 can proxy for client terminals 20 in a manner that facilitates the respective client terminals 20 in accessing account data residing on sub-domains of the TPNS 10. The network proxy service 210 can, for example, enable the client terminals 20 to utilize a single certificate that is issued by the network proxy service 210 to access domains and subdomains of the TPNS 10. In some examples, the network proxy service 210 can implement a link structuring scheme, in which client requests 211 that are intended for forwarding to the TPNS 10 are communicated with links that are structured ("packed links") in a manner that is specific to, for example, the domain of the network proxy service 210 ("proxy-domain specific structure"). The network proxy service 210 can restructure the packed links (or "unpack" the links) communicated with or as part of client requests 211, into a link structure that is native to the TPNS 10. In other words, the packed links of the client requests 211 can be unpacked to have the native structure of the TPNS 10, before the client requests 211 are forwarded to the TPNS 10 as restructured/unpacked client requests 213. As part of the proxy service, the network proxy service 210 can implement the link structuring scheme so that response communications 221 from the TPNS 10 are received in the native (or unpacked) structure of the TPNS 10, then restructured into the proxy-domain specific structure (i.e. "packed") before the response communications are forwarded to a respective client terminal 20 as restructured client responses 223.

As an example, the network proxy service 210 can receive (via the client interface 202) client requests 211 that specify links of the TPNS 10 in a packed structure, where the links in the packed structure include alternative syntax (e.g., "-" or hyphen) to identify sub-domains. The network proxy service 210 can parse URLs of individual client request 211 to identify the alternative syntax markers of the sub-domains, and to remove corresponding domain components from the respective links. The network proxy service 210 can also structure the syntax of the respective links to include a suffix proxy format. In examples, the network proxy service 210 restructures the links from the packed structure into an unpacked or native structure, where the alternative syntax of the packed links is replaced with target syntax (e.g., "." or dot) that is recognized by the TPNS 10 to designate, for example, subdomains of the TPNS 10. For response communications 221, the network proxy service 210 can parse the communication to identify an unpacked (or natively structured) link of the response communication 221. The network proxy service 210 can restructure the unpacked link into a packed structure, where, for example, alternative syntax (e.g., "-" or hyphen) is used to designate a subdomain portion of the individual links that specified or embedded in the response communication 221.

In providing the proxy service, some examples provide that the network proxy service 210 can also issue a single proxy-domain specific SSL certificate to each of the client terminals 20. The individual client terminals 20 can use the single proxy-domain specific SSL certificate for verification when sending client requests 211 and receiving client responses 223 from the TPNS 10. The network proxy service 210 can further store and utilize a collection of SSL certificates that are issued by, or for use with, the TPNS 10, in order to access sub-domains of the TPNS 10 on behalf of requesting client terminals 20. As a result, the network proxy service 210 can enable, for example, browsers running on the client terminals 20 to access domains and sub-domains of the TPNS 10, using a single proxy-domain specific certificate. The network proxy service 210 can receive and verify client requests 211 using the proxy-domain specific SSL certificate, then forward the client request 211 with the unpacked links to the TPNS 10, and use one or multiple stored SSL certificates of the TPNS 10 to access sub-domains specified or used with the client request 211. In this way, the network proxy service 210 can be implemented to enable the client terminals 20 to utilize browsers to have full access to the respective account's data collection, as hosted by the TPNS 10 (e.g., including domains and sub-domains), while alleviating burdensome certificate requisites that may otherwise be required from the TPNS 10.

Additionally, the intercept system 200 can include an archival service 220 that can selectively archive data sets in communications that the system receives and forwards as between client terminals 20 (e.g., operating as part of the enterprise network 14) and the TPNS 10. In examples, the archival service 220 can implement data filters to identify target data sets for archival. The archival service 220 can, for example, implement archive filters (not shown in FIG. 2) with the client interface 202 and/or service interface 204, to filter respective client requests 211 and/or response communications 221, from which archival can be extracted. As described by various examples, the archival service 220 can generate an archival data set for storage with an archival data store 260 that is independent of the TPNS 10.

In some examples, the archival data store 260 can be configured to store an archive representation of select portions of the target account 12, such as portions of the account data that are pre-identified or deemed to be mission critical data for the respective enterprise account. The archival representation can include data that reflects a change or update to the target account 12, as well as data that reflects a state of select data items that are pre-associated, or otherwise identified, as being relevant to the change or update. For example, the archival data representation can include data that reflect a field (e.g., cell of table) that is changed by a client request 211, as well as data that reflects other fields (e.g., other cells) that are pre-associated or are otherwise contextually relevant to the changed data item. In such examples, the other fields can be identified from, for example, one or more service response communications 221 that are made in context of the corresponding client request 211, such as during the client terminal's session, as well as prior to or in response to the client request 211 in which the data item is changed. The service response(s) can reflect, for example, a state or value of the other pre-associated data items at the time when the change resulting from the client request 211 is made to the target account 12 of the TPNS 10.

According to some examples, the archival service 220 can be used in connection with the archival data store 260 being configured to be available to client terminal(s) 20, independent of the TPNS 10. Still further, in some variations, the archival data store 260 can reside within the enterprise network 14 of the client terminals 20, such that client terminals 20 can access the data subject to rules and policies of the enterprise, and independent of the TPNS 10. In variations, the archival data store 260 can be integrated with the intercept system 200, independently of the TPNS 10.

Additionally, the archival data representation(s) of the data of the target account 12 can be generated from data included with the processed client requests 211 and/or service response communications 221. Still further, the archival service 220 can generate the archival data representation(s) of the target account's data exclusively from data extracted from client requests 211 and/or service response communications 221. In this way, the data of the archival data store 260 is generated without the intercept system 200 having to separately query the TPNS 10 for data from the target account 12.

The anonymization service 230 can be implemented using, for example, the anonymization system 100 of examples of FIG. 1. Accordingly, reference to components of FIG. 1 are intended to illustrate an example of functionality that can be implemented with respect to an example described. As an intercept service, the anonymization service 230 can employ filters to identify select data items from client requests 211, for which data anonymization processes can be triggered. The client requests 211 can specify, for example, write operations to anonymize data residing with the target account 12 of TPNS 10. When implemented as an intercept service, the anonymization service 230 can identify, for example, a specific data structure or item, as part of the client requests 211. The anonymization service 230 can implement an extraction process (e.g., using the extraction component 122) to identify which data items of the client request 211 meet a set of predetermined conditions for anonymization. The anonymization service 230 can further access a token store 242 to retrieve an anonymization token 241 for implementing the anonymization process on select data items that are included in the client requests 211 and which meet the anonymization condition(s). The anonymization service 230 can use the token 241 to generate an anonymized form of the select data items, without altering a format of the data set that contains the anonymized data items. In turn, the anonymization service 230 can, through service interface 204, update a data structure (e.g., record or document) that corresponds to the data set of the client request 211. The service interface 204 can, for example, implement one or more write-type operations that cause corresponding data items, residing on the TPNS 10, to be permanently altered and anonymized. For example, the anonymization service 230 can, through the service interface 204, update a TPNS record that is specified by the client request 211, with field values that have been anonymized by the anonymization service 230. In this way, the anonymization service 230 can permanently alter and anonymize records resident with the target account 12 of the TPNS 10, through inspection of data sets included with the client requests 211.

As described with other examples, once anonymized, the records of the target account 12 can be made to include field values that include randomly generated sequences of characters that anonymize the information that would otherwise be conveyed by those field values. While the changes to the data items are permanent, the underlying data structures of those data items can retain their respective utility within the larger set of the target account 12.

In examples, the services of the intercept system 200 can be integrated, with some services utilizing other services of the intercept system 200. For example, the anonymization service 230 can use the network proxy service 210 to locate the subdomains where records or other data structures that coincide with data sets of the client requests 211. For example, the anonymization service 230 can implement write-type operations to update select records of the client request 211 where data has been identified for anonymization, as determined by the network proxy service 210.

Likewise, the archival service 220 can employ filters to identify client requests 211 which relate to data items that reside at a given subdomain of the TPNS 10. As the client request 211 may be packed (to include alternative syntax for identifying domains), the archival service 220 can integrate the filters with the processes of the network proxy service 210 to identify client requests 211 in their respective unpacked form (to include the native structure of the TPNS 10 for designating subdomains). Thus, for example, the network proxy service 210 can process a client request 211 by unpacking the communication (e.g., replacing syntax to identify subdomains), and the archival service 220 can employ the filters to identify updates to the target account 12 that are specified by the client request, based on the subdomain identified by the unpacked client request.

In some examples, the anonymization service 230 anonymizes records that are stored with the target account 12 of TPNS 10, as well as corresponding data representations as stored with the archival data store 260. In this manner, the intercept system 200 can deploy anonymization service 230 to anonymize archive data (e.g., such as archival data stored in the archival data store 260), as well as data that may be in otherwise active use as part of the target account 12.

In other examples, the archival service 220 can directly use anonymization service 230. For example, once a data set of the client requests 211 is identified for archival by the archival service 220, the archival service 220 can automatically subject the identified data set to an anonymization process, as provided by the anonymization service 230. The anonymization service 230 can return anonymized form of the identified data set. The archival service 220 can then archive the anonymized data set with the archival data store 260. In this way, the archival service 220 can be implemented so as to not inadvertently store information that may become anonymized at a later time. In some variations, anonymization service 230 can be implemented so that when archival data is anonymized, the anonymization service 230 automatically updates the corresponding record residing with the target account 12 of TPNS 10, to reflect anonymized field values or content.

As the anonymization service 230 can anonymize select portions of individual records without altering the structure of the record, the anonymization service 230 can update (and thus anonymize) alternative representations of the anonymized records, including, for example, archival representations such as may be stored with the archival data store 260. Accordingly, once the anonymization service 230 identifies a record or other data structure to anonymize (e.g., from the client request 211), the anonymization service 230 may communicate the anonymized record 235 to the archival service 220. The archival service 220 may then provide an anonymization update 261 to the archival data store 260 using the anonymized record 235, where the archival update 261 permanently alters and anonymizes the representation of the anonymized record 235 within the archival data store 260.

While some examples of FIG. 2 describe implementations in which the anonymization service 230 anonymizes datasets identified from client request 211, the anonymization service 230 can also be implemented as a backend service that can be used with the intercept computer system 200 and or/one or more intercept services, such as described. In some examples, the anonymization service 230 can be implemented with a web service interface 232, to receive service calls or triggers from other processes or programmatic entities. The web service interface 232 can correspond to, for example, a Representation State Transfer (REST) interface. In examples in which the anonymization service 230 is implemented as a hybrid, the anonymization service 230 can process client requests 211 to identify data files, records or other structures that may be subject to anonymization. The anonymization service 230 can also be responsive to triggers, processes or other or other events, including to calls and/or instructions or data received through the web service interface 232.

Methodology

Figure 3:
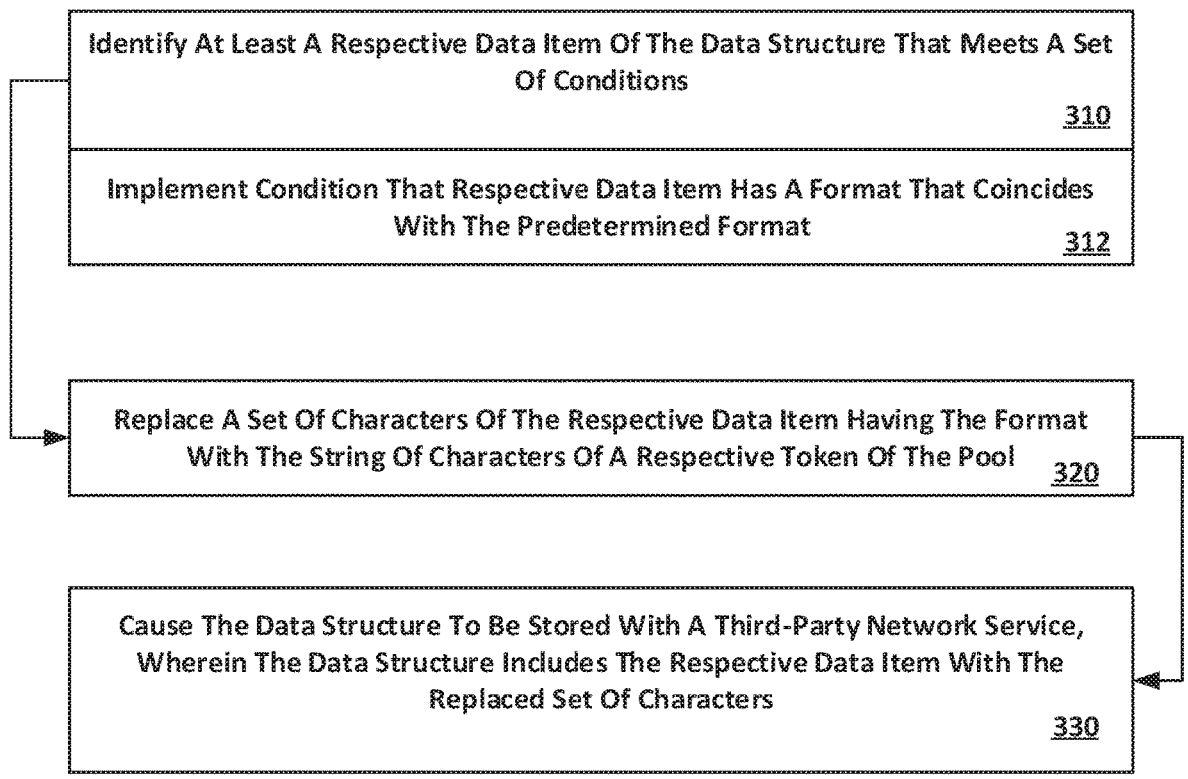
FIG. 3 illustrates an example method for implementing a data anonymization service for use with a third-party network service.

FIG. 3 illustrates an example method for operating a data anonymization system to anonymize data items that are stored with a third-party network service. A method such as described with an example of FIG. 3 can be implemented using, for example, a network computer system, such as described with examples of FIG. 1 or FIG. 2. Accordingly, reference may be made to elements of FIG. 1 or FIG. 2 for purpose of implementing a step or sub-step being described.

With reference to an example of FIG. 3, the anonymization system 100 can identify one or more data items of individual data structures that meets a set of conditions for anonymization (310). In examples, the anonymization system 100 is implemented as or with an intercept service, and the data structures for anonymization can be identified from processing client requests 211 and other client communications.

To identify data items, the anonymization system 100 can implement one or more conditions, including a format condition in which a data item, or portion thereof, has a predetermined format that also coincides with a format of a collection of anonymization tokens (312). By way of example, the format condition can specify one or more formats for PII (e.g., phone numbers, email addresses, names).

The anonymization system 100 can replace a set of characters of the respective data item having the format with characters of a respective token of a token pool (320). For example, a data item may correspond to a phone number, and a token used to anonymize the data item can include a sequence of character strings which have a format that coincides with that of the data item.

In examples, the anonymization system 100 can cause the respective data item to be stored with TPNS 10 as part of the data structure, where the respective data item includes the string of characters of the respective token in place of the replaced set of characters (330). In examples in which the anonymization system 100 is implemented as an intercept service, the anonymization system 100 can, anonymize data items of the respective data structures, so as to store anonymized forms of the data structures with the TPNS 10. In variations, the anonymization system 100 can anonymize by retrieving data structures for anonymization from the target account 12 of the TPNS 10. The retrieval can be implemented as part of a backend process, or in response to an event, such as a request from another process or programmatic entity. In such examples, the anonymization system 100 can selectively anonymize data items of the received data structures, then update or otherwise return anonymized forms of select data items with the respective data structures, as stored with the target account 12 of the TPNS 10.

Hardware Diagram

Figure 4:
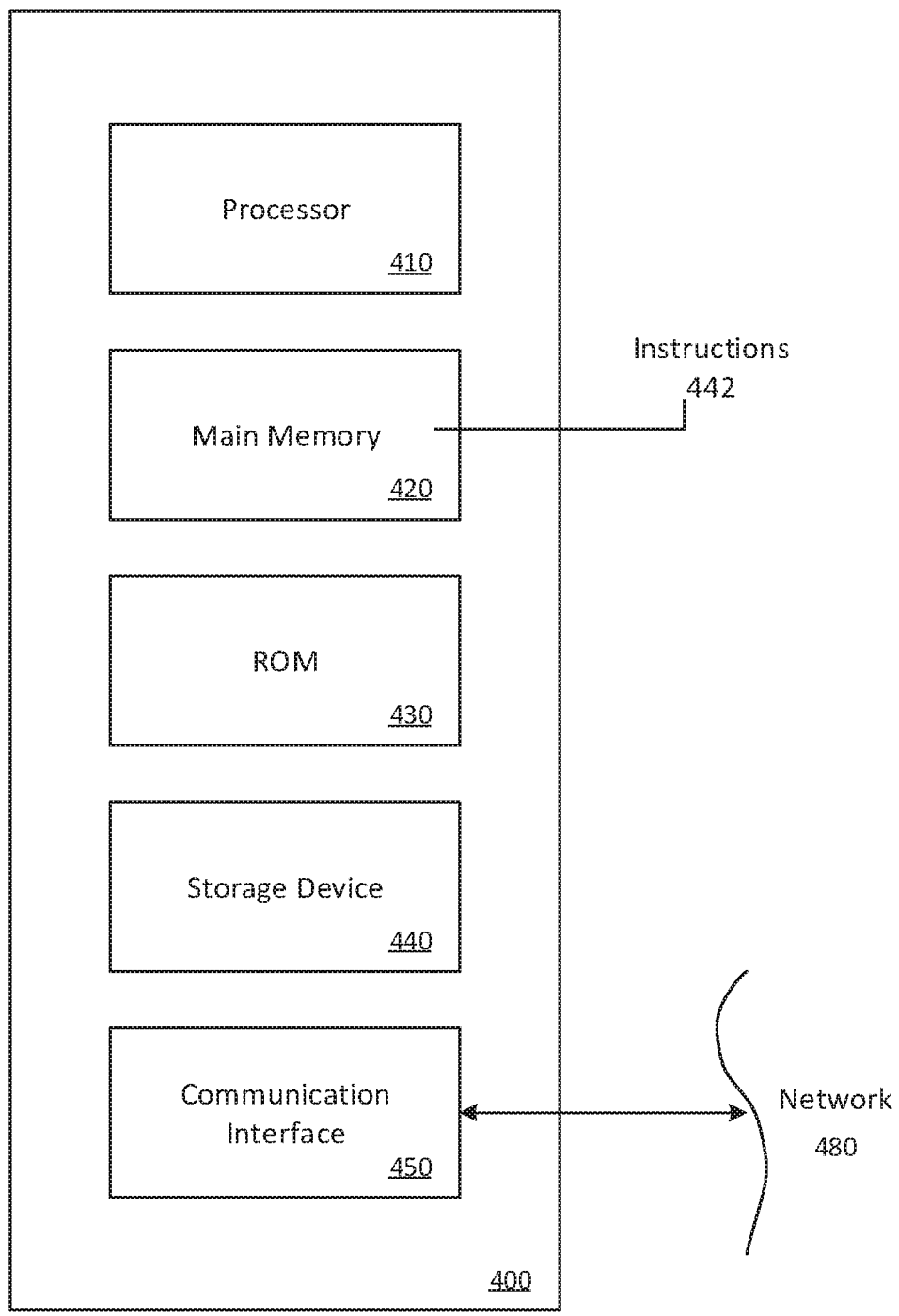
FIG. 4 is a block diagram that illustrates a computer system upon which embodiments described herein may be implemented.

FIG. 4 is a block diagram that illustrates a computer system upon which embodiments described herein may be implemented. For example, in the context of FIG. 1, the data anonymization system 100 can be implemented using a computer system such as described by FIG. 4. Likewise, in the context of FIG. 2, the intercept system 200 can be implemented using a computer system such as described with an example of FIG. 4. Additionally, a method such as described with an example of FIG. 3 can be implemented using a computer system such as described with an example of FIG. 4. Still further, examples of FIG. 1, FIG. 2 and/or FIG. 3 can be implemented using a combination of multiple computer systems as described by FIG. 4.

In one implementation, a computer system 400 includes processor(s) 410, a main memory 420, a read only memory (ROM) 430, a storage device 440, and a communication interface 450. The computer system 400 includes the at least one processor 410 for processing information and executing instructions stored in the main memory 420. The main memory 420 can correspond to, for example, a random access memory (RAM) or other dynamic storage device, for storing information and instructions to be executed by the processor 410. The main memory 420 can also be used for storing temporary variables or other intermediate information during execution of instructions to be executed by the processor 410. The computer system 400 may also include the ROM 430 and/or other static storage device for storing static information and instructions for the processor 410. A storage device 440, such as a magnetic disk, solid state drive or optical disk, can be provided to store data sets, such as provided by the archival data store 260. The main memory 420 can store instructions 442 for implementing a data anonymization system or service, such as described with examples of FIG. 1 or FIG. 2. Additionally, the processor 410 can execute the instructions 442 to implement a method such as described with an example of FIG. 3.

The communication interface 450 can enable the computer system 400 to communicate with one or more networks 480 (e.g., cellular network) through use of the network link (wireless or wireline). Using the network link, the computer system 400 can communicate with, for example, client terminals 20, servers and one or more third-party network services 10.

Examples described herein are related to the use of the computer system 400 for implementing the techniques described herein. According to one embodiment, those techniques are performed by the computer system 400 in response to the processor 410 executing one or more sequences of one or more instructions contained in the main memory 420. Such instructions may be read into the main memory 420 from another machine-readable medium, such as the storage device 440. Execution of the sequences of instructions contained in the main memory 420 causes the processor 410 to perform the process steps described herein. In alternative implementations, hard-wired circuitry may be used in place of or in combination with software instructions to implement examples described herein. Thus, the examples described are not limited to any specific combination of hardware circuitry and software.

CONCLUSION

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A data anonymization computer system comprising:
one or more processors;
memory resources storing (i) a set of instructions, and (ii) a pool of tokens, each token of the pool comprising a string of characters having a predetermined format;
wherein the one or more processors execute the set of instructions to:
selectively anonymize one or more data items of each data structure from a plurality of data structures prior to forwarding the plurality of data structures to a third-party network service, by, for each data structure of the plurality of data structures:
identifying at least a respective data item of the data structure that meets a set of conditions, including at least a first condition in which at least a portion of the respective data item has a format that coincides with the predetermined format; and
replacing a set of characters of the respective data item having the format with the string of characters of a respective token of the pool;
forward the plurality of data structures to the third-party network service with each of the respective data items having the string of characters of the respective token in place of the replaced set of characters; and
replenish the pool of tokens with additional tokens that have not previously been added to the pool.

2. The data anonymization computer system of claim 1, wherein the one or more processors selectively anonymize the one or more data items of each data structure of the plurality of data structures in connection with an intercept service that is provided for a set of client computers that are associated with an account of the third-party network service.

3. The data anonymization computer system of claim 2, wherein the intercept service includes a proxy service.

4. The data anonymization computer system of claim 2, wherein the intercept service includes an archival service, and wherein the one or more processors execute the set of instructions to selectively anonymize an archival representation of at least a first data structure of the plurality of data structures, while causing the first data structure to be stored at the third-party network service with the string of characters of the respective token in place of the replaced set of characters.

5. The data anonymization computer system of claim 1, wherein the one or more processors execute the set of instructions to:
retrieve the plurality of data structures from the third-party network service; and
selectively anonymize the one or more data items of each data structure of the plurality of data structures before causing the data structure to be stored with the third-party network service.

6. The data anonymization computer system of claim 1, wherein the predetermined format is defined at least in part by a character length of the string of characters.

7. The data anonymization computer system of claim 1, wherein the string of characters includes multiple predefined segments, and wherein the predetermined format is defined at least in part by a sub-format of at least one of the multiple predefined segments, including by at least a character length of the at least one predefined segment.

8. The data anonymization computer system of claim 1, wherein the respective data item corresponds to a field value of a record, and wherein the set of conditions include at least a second condition that is based on metadata associated with at least one of the field value of the record.

9. The data anonymization computer system of claim 8, wherein the metadata includes a creation date or modification date of the field value.

10. The data anonymization computer system of claim 1, wherein the respective data item corresponds to a field value of a record, and wherein the set of conditions include at least a second condition that is based on a second field value of the record.

11. The data anonymization computer system of claim 1, wherein the one or more processors execute the set of instructions to receive administrator input or policy that defines at least one or more conditions of the set of conditions.

12. The data anonymization computer system of claim 1, wherein an administrator input or policy specifies a rule set that defines a second condition in the set of conditions.

13. The data anonymization computer system of claim 1, wherein the one or more processors execute the set of instructions to log each token that is added to the pool.

14. A method for selectively anonymizing individual data items of a plurality of data structures, the method being implemented by one or more processors and comprising:
selectively anonymizing one or more data items of each data structure from the plurality of data structures prior to forwarding the plurality of data structures to a third-party network service, by, for each data structure of the plurality of data structures:
identifying at least a respective data item of the data structure that meets a set of conditions, including at least a first condition in which at least a portion of the respective data item has a designated format; and
replacing a set of characters of the respective data item having the designated format with a string of characters of a respective token of a pool of tokens, wherein the string of characters of the respective token has a format that coincides with the designated format;
forwarding the plurality of data structures to the third-party network service with each of the respective data items having the string of characters of the respective token in place of the replaced set of characters; and
replenishing the pool of tokens with additional tokens that have not previously been added to the pool.

15. A non-transitory computer readable medium that stores instructions, which when executed by one or more processors of a computer system, cause the computer system to perform operations that include:
selectively anonymizing one or more data items of each data structure from a plurality of data structures prior to forwarding the plurality of data structures to a third-party network service, by, for each data structure of the plurality of data structures:
identifying at least a respective data item of the data structure that meets a set of conditions, including at least a first condition in which at least a portion of the respective data item has a designated format; and
replacing a set of characters of the respective data item having the designated format with a string of characters of a respective token of a pool of tokens, wherein the string of characters of the respective token has a format that coincides with the designated format; and
forwarding the plurality of data structures to the third-party network service with each of the respective data items having the string of characters of the respective token in place of the replaced set of characters; and
replenishing the pool of tokens with additional tokens that have not previously been added to the pool.

* * * * *